Oct. 14, 1969    R. GOTTSCHALD    3,472,540

BALL JOINTS, ESPECIALLY TO BE USED WITH MOTOR VEHICLES

Filed Sept. 1, 1967

INVENTOR
RUDOLF GOTTSCHALD by Arthur Schwartz

United States Patent Office

3,472,540
Patented Oct. 14, 1969

3,472,540
BALL JOINTS, ESPECIALLY TO BE USED WITH MOTOR VEHICLES
Rudolf Gottschald, Osterath, Germany, assignor to A. Ehrenreich & Cie., Dusseldorf-Oberkassel, Germany
Filed Sept. 1, 1967, Ser. No. 665,142
Claims priority, application Germany, Oct. 8, 1966, E 32,610
Int. Cl. F16c 11/06
U.S. Cl. 287—87                                   14 Claims

ABSTRACT OF THE DISCLOSURE

A ball joint having an annular collar socket member attached to the joint pin and having a radially extending flange at one end, a bellow seal member having an end portion thereof which is fitted against the socket and flange.

---

The present invention relates to a ball joint, especially to be used with motor vehicles, comprising a joint case or housing and a joint pin supported in said joint case by means of a ball head so that said joint will be movable towards any side, the passage opening of the joint case for the joint pin being closed by a bellow seal packing which has been made from elastic material. One rim of said packing is fixed to the joint case and the other rim has been sealed with respect to the joint pin.

With ball joints of the above type it may happen that the bellow packing glides towards the joint case being squeezed or deformed due to the angular deflections of the joint pin.

The principal object of the present invention, therefore, is to provide a ball joint, and more particularly a ball joint comprising a bellow packing, such that gliding of the bellow packing towards the joint case and displacement of the bellow packing will be avoided, while the safety of the desired packing will not be impaired.

To prevent the bellow packing from gliding towards the joint case, for instance, by providing a distance sleeve surrounding the joint pin within the area between the surrounding point by the bellow packing and the ball head, commencing at said surrounding point and terminating at the ball head, does in itself not yet present an absolutely satisfactory solution of the problem. This is because the elastic material from which the bellow packing has been made and which is usually rubber, is liable to stick to the joint pin at the surrounding point of the joint pin so that turning of the joint pin in the bellow packing is impeded thus also affecting the bellow packing. In addition, due to the tolerances of the conical part of the joint pin which is surrounded by the bellow packing, axial fixation of the bellow packing or clamping of the bellow packing surrounding point may occur or the bellow packing may be subject to clearance on the conical shaft of the joint pin in the axial direction, said clearance being undesirable with a view to tightness.

The aforementioned drawbacks have been eliminated by the present invention solving the problem in that a sleeve especially consisting of hard plastic with a low friction value, being located on the joint pin in the bellow opening passed by said joint pin, having a supporting collar or supporting flange for the bellow rim facing the pin on the rim side not facing the ball head in connection with a securing means preventing the bellows from gliding towards the joint case on the side facing the pin, said means being a distance piece contacting the surrounding point of the bellow packing from the inside extending from the ball head side, will have been provided.

With the arrangement according to the present invention the joint pin will be able to move through the bellow packing or the material from which the same has been made respectively without any interference; for the exterior peripheral surface of the sleeve being positioned rigidly on the joint pin is a surface with favorable gliding properties with respect of the surrounding point of the bellow packing, in which case said gliding surface may be cylindrical. The position of the bellow packing at the surrounding area is secured by the supporting flange. Simultaneously gliding of the bellow packing towards the joint case will be prevented. A negative effect of the conical tolerances will not be given, since the sleeve is taking into account such tolerances without any consequences on surrounding by the bellows. Superpolyamide plastic is preferably chosen as a low friction plastic.

Another favorable feature of the supporting flange or collar is that the exterior rim of the surrounding point of the bellow packing may project as a ring or even as a lip beyond the face of the surrounding point on the side not facing the ball head, forming an additional packing which contacts the supporting flange or collar.

In this connection elasticity of the material from which the bellow packing has been made is especially favorable if the rim has been undercut.

A spring ring or the like surrounding the rim within the undercut area may improve the packing effect towards the supporting flange or collar apart from its radially effective surrounding force even in the axial direction.

It may be practical to provide the flange or collar of the sleeve with a rim overlapping the exterior surface of the bellow part surrounding the sleeve. A rim of this type is not only a socket of a supporting nature, but it will at the same time improve packing contact.

To increase the desired packing effect it may also be favorable that the inside periphery of the bellow opening surrounding the sleeve and/or the outside periphery of the sleeve surrounded by the bellow opening may be provided with roundabout ribs and/or roundabout grooves. If one of the engaging parts has been provided with roundabout ribs and the other one of these parts with roundabout grooves, the ribs will engage with the grooves.

The distance piece or safety means preventing the bellow packing from gliding towards the joint case may be a socket positioned on the joint pin inside the bellow packing, projecting from the surrounding point of the joint pin or sleeve by the bellow packing towards the ball head, being separate from the bellow packing, rigidly located on the joint pin, and bridging the distance between the ball head and the surrounding point.

Said socket may consist of elastic material, preferably of rubber elastic plastic, and more particularly of polyurethane of a cross-linked structure. In this case sleeve and socket are two parts.

In a preferred embodiment of the present invention the distance socket and the sleeve are a one piece unit of especially hard plastic with a low friction value such as polyamide plastic.

In this case the sleeve has preferably been provided with slots on the side facing the ball head. Due to said slots it will be possible that the plastic part forming sleeve and socket can easily be placed onto the joint pin by sliding.

According to the present invention it may also be possible to provide the joint pin with a distance safety means which is a collar or bead rib, a shoulder or similar and to use the same together with the socket.

The drawing shows several examples of a construction according to the present invention.

Figure 1:
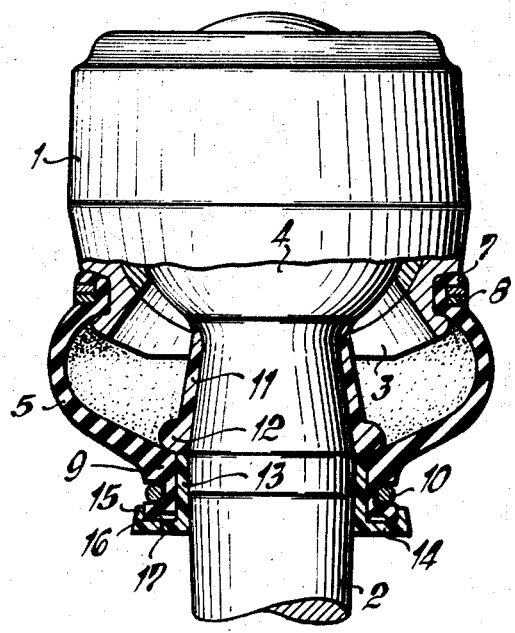
FIG. 1 is a vertical section of a preferred embodiment of a ball joint.

With all embodiments the joint case has been identified by 1 and the joint pin by 2. The opening of the joint case for the passage of the joint pin has been defined as 3, while the ball head of the joint pin has been defined as 4.

The bellow packing 5 has been provided to seal the opening of the joint case for the passage of the joint pin. The drawing shows the bellow packing in the position which it will have after sliding onto the joint pin together with the socket 13.

The bellow packing has been attached to the outside of the joint case engaging with its rim 7 facing the joint case into an exterior groove of the joint case. The rim is fixed into said groove, for instance, by the spring rings 8. The other rim 9 of the bellows is sealed towards the joint pin 2. As may be seen from FIG. 1, a socket 13 of hard plastic with a low friction value such as superpolyamide plastic has been pushed onto the joint pin 2. The socket 13 has been rigidly attached to the joint pin and is following the movements of the same. The bellow rim 9 surrounds the socket which is movable in the bellow opening by which it is surrounded. On the side not facing the ball head the socket 13 has been provided with a radial flange or collar 14 which is contacted by the exterior face of the rim 9. The flange or collar 14 may be provided with a rim 15 overlapping the exterior surface of the bellow part surrounding the socket 13.

The exterior rim 16 of the bellow packing part surrounding the socket 13 may annularly project beyond the exterior face 17 of the bellow packing and contact the flange or collar 14.

The exterior rim 16 may also be undercut or its peripheral surface may have been provided with a roundabout groove. The roundabout groove may receive a spring ring 10 enforcing surrounding of the socket 13 by the rim 9.

Figure 2:
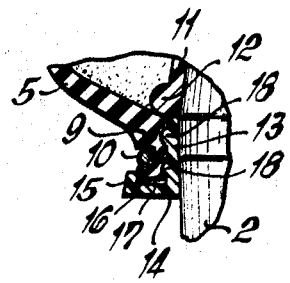
FIG. 2 is a detail view of the socket together with the surrounding part of the bellow packing.

According to FIG. 2 the inside periphery of the bellow opening surrounding the socket 13 has been provided with roundabout grooves, while the outside periphery of the socket has been provided with roundabout ribs 18. The roundabout ribs 18 of the socket engage into the roundabout grooves of the bellow opening.

With the embodiment according to FIG. 1 a distance sleeve or supporting sleeve 11 made from elastic material, preferably from rubber elastic plastic and more particularly from polyurethane with a cross-linked structure, has been provided on the joint pin 2 inside the bellow packing. The distance sleeve is rigidly attached to the joint pin and is moving together with the same. Said sleeve extends from the ball head 4 towards the rim 9 of the bellow packing surrounding the joint pin. On the outside the rim of the distance sleeve contacting the bellow rim 9 has been enforced to form a bead 12 or a flange contacting the interior surface of the bellow packing facing the same.

Figure 3:
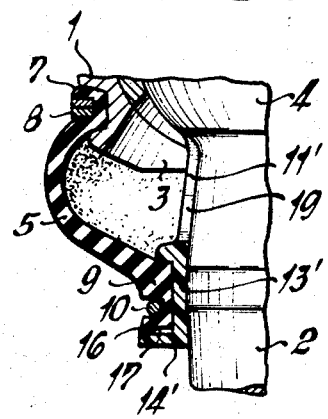
FIG. 3 shows another preferred embodiment by illustrating one-half of the joint pin together with a part of the bellow packing.

With the embodiment according to FIG. 3 the distance sleeve 11' and the socket 13' are of one piece. Both have been made from hard plastic with favorable gliding properties such as superpolyamide base plastic. The sleeve 11' has been provided with slots 19 starting from the side facing the ball head 4.

Figure 4:
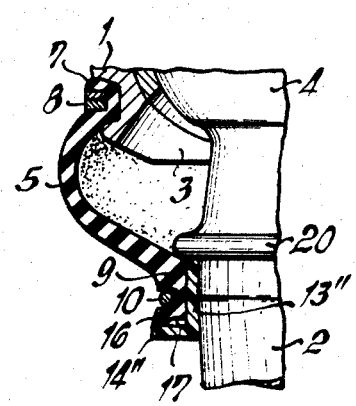
FIG. 4 is a vertical section of a part of the ball joint in which the distance piece is a rib or a bead of the joint pin.

FIG. 4 shows another possible embodiment of the ball joint in which distance securing at the joint pin is effected by a collar or a bead rib 20 of the joint pin. The socket has been identified by 13". The overlapping rim of the socket flange 14" which, in FIG. 1, has been defined as 15, has been omitted in FIG. 4.

What I claim is:
1. A ball joint comprising:
 (a) a housing member,
 (b) a ball member positioned in said housing,
 (c) a joint pin, one end of said joint pin attached to said ball member, the other end of said joint pin extending through an opening in said housing,
 (d) a bellow seal packing member,
 (e) one end of said bellow seal packing member being attached to said housing at a point adjacent said opening,
 (f) an annular collar socket member of substantially hard plastic, low friction material securely attached around said joint pin,
 (g) said annular collar socket member having a supporting flange at one end thereof extending substantially radially outwardly relative to said joint pin,
 (h) said bellow seal packing member having an axial end portion positioned axially around said collar socket member and terminating in a substantially radial end flange having a face portion facing away from said housing and extending substantially radially outwardly relative to said joint pin and terminating in a lip extending from the plane of said face, with said lip engaging said supporting flange.

2. A ball joint as defined in claim 1 including an undercut portion in said bellows seal packing member and a spring ring positioned therein.

3. A ball joint as defined in claim 1 including a rim at the end of said supporting flange and in contact with said substantially radial end flange.

4. A ball joint as defined in claim 1 including a rib bead on said joint pin, said annular collar socket member having another end, said other end abutting said rib bead.

5. A ball joint as defined in claim 1 wherein the inside of said bellow seal packing and the outside of said collar socket member have complementary ribs and grooves.

6. A ball joint as defined in claim 1 including a sleeve surrounding said pin attached to said annular collar socket member and extending therefrom and terminating at said ball member.

7. A ball joint as defined in claim 6 wherein said sleeve is of hard plastic material.

8. A ball joint as defined in claim 6 including slots in said sleeve.

9. A ball joint comprising:
 (a) a housing member,
 (b) a ball member positioned in said housing,
 (c) a joint pin, one end of said joint pin attached to said ball member, the other end of said joint pin extending through an opening in said housing,
 (d) a bellow seal packing member,
 (e) one end of said bellow seal packing member being attached to said housing at a point adjacent said opening,
 (f) an annular collar socket member of substantially hard plastic, low friction material securely attached around said joint pin,
 (g) said annular collar socket member having a supporting flange at one end thereof extending substantially radially outwardly relative to said joint pin,
 (h) said bellow seal packing member having an axial end portion positioned axially around said collar socket member and terminating in a substantially radial end flange,
 (i) an undercut portion in said bellows seal packing member and a spring ring positioned therein,
 (j) and a rim at the end of said supporting flange and in contact with the end of said substantially radial end flange.

10. A ball joint as defined in claim 9 including a rib bead on said joint pin, said annular collar socket member having another end, said other end abutting said rib bead.

11. A ball joint as defined in claim 9 wherein the inside of said bellow seal packing and the outside of said collar socket member have complementary ribs and grooves.

12. A ball joint as defined in claim 9 including a sleeve surrounding said pin attached to said annular collar socket member and extending therefrom and terminating at said ball member.

13. A ball joint as defined in claim 12 wherein said sleeve is of hard plastic material.

14. A ball joint as defined in claim 12 including slots in said sleeve.

References Cited

UNITED STATES PATENTS

| | | |
|---|---|---|
| 2,707,645 | 5/1955 | Moskovitz. |
| 2,752,180 | 6/1956 | Vogt _____ 287—87 |
| 2,921,809 | 1/1960 | Kogstrom. |
| 3,155,407 | 11/1964 | Gottschald _____ 287—87 |
| 3,164,389 | 1/1965 | Thomas. |

FOREIGN PATENTS

| | | |
|---|---|---|
| 1,000,617 | 8/1965 | Great Britain. |
| 1,000,622 | 8/1965 | Great Britain. |

CARL F. TOMLIN, Primary Examiner

A. V. KUNDRAT, Assistant Examiner

U.S. Cl. X.R.

277—212